(12) United States Patent
Perlman et al.

(10) Patent No.: US 6,901,076 B2
(45) Date of Patent: May 31, 2005

(54) DYNAMIC LAN BOUNDARIES

(75) Inventors: Radia J. Perlman, Sammamish, WA (US); Eric A. Guttman, Waibstadt (DE)

(73) Assignee: Sun Microsystems, Inc., Santa Clara, CA (US)

( * ) Notice: Subject to any disclaimer, the term of this patent is extended or adjusted under 35 U.S.C. 154(b) by 472 days.

(21) Appl. No.: 09/726,800

(22) Filed: Nov. 30, 2000

(65) Prior Publication Data

US 2002/0093968 A1 Jul. 18, 2002

(51) Int. Cl.$^7$ .......................... H04L 12/28; H04L 12/56
(52) U.S. Cl. .................. 370/401; 370/402; 370/404
(58) Field of Search ............... 370/401, 400, 370/351, 255, 466, 469, 402, 403, 404, 405, 408, 411, 395.5, 395.52, 395.54, 395.6; 709/238, 244

(56) References Cited

U.S. PATENT DOCUMENTS

| | | | | |
|---|---|---|---|---|
| 5,398,242 A | | 3/1995 | Perlman ................. | 370/85.13 |
| 5,420,862 A | * | 5/1995 | Perlman .................... | 370/401 |
| 5,426,637 A | * | 6/1995 | Derby et al. ............... | 370/401 |
| 5,500,860 A | * | 3/1996 | Perlman et al. ............ | 370/401 |
| 5,796,740 A | * | 8/1998 | Perlman et al. ............ | 370/401 |
| 5,802,278 A | * | 9/1998 | Isfeld et al. ................ | 709/249 |
| 6,147,993 A | * | 11/2000 | Kloth et al. ................ | 370/392 |
| 6,339,595 B1 | * | 1/2002 | Rekhter et al. ............. | 370/392 |
| 6,747,979 B1 | * | 6/2004 | Banks et al. ................ | 370/401 |

OTHER PUBLICATIONS

Webopedia Definitions and Links, http://webopedia.internet.com/TERM/brouter.html.

Sidhu et al., "Inside Apple Talk", Second Edition, Chapters 1, 4 and 5, Addison–Wesley Publishing Company, Inc., 1990.

Troll, Ryan, "Automatically Choosing an IP Address in an Ad–Hoc IPv4 Network", IETF Dynamic Host Configuration WG, Internet Draft Document, Apr. 14, 1999.

Thompson, S., "IPv6 Stateless Address Autoconfiguration", IETF Network WG, RFC 2462, Dec. 1998.

Seifert, W.M., "Integrated routing (and bridging)," Local Computer Networks, 1989, Proceedings 14$^{th}$ Conference on, Minneapolis, MN, USA Oct. 10–12, 1989, IEEE Computer Society, pp. 270–277.

* cited by examiner

*Primary Examiner*—Wellington Chin
*Assistant Examiner*—Jamal A. Fox
(74) *Attorney, Agent, or Firm*—Kudirka & Jobse, LLP

(57) ABSTRACT

A network device dynamically switches between layer 2 (data link) operation and layer 3 (network) operation. When enabled, bridging logic functions as a data link bridge, receiving data link messages from communications links forming part of a single network-layer segment and forwarding the messages to another communications link using layer-2 addresses in the messages. When enabled, routing logic functions as a network router, receiving network layer messages from different network-layer segments and forwarding the messages to other links based on a routing algorithm and the network layer addresses. Selection logic dynamically selects the desired function under different operating conditions. For a transition from router to bridge, multiple network-layer segments are merged into a single bridged network-layer segment, freeing up link numbers for use in configuring addresses for other segments. For the transition from bridge to router, a single bridged network-layer segment is divided into multiple segments having distinct routing identities.

14 Claims, 1 Drawing Sheet

DYNAMIC LAN BOUNDARIES

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communications networks, and more particularly to techniques for configuring node addresses in Internet Protocol (IP) and other networks.

One task to be performed in managing data communications networks is assigning addresses to network nodes, a process also referred to as "configuring" addresses in the network. In particular, it is necessary to configure addresses used at the network layer, or layer 3, of network operation as defined in the Open Systems Interconnect (OSI) communications model. At the network layer, message routing protocols are generally used to route messages among the network nodes. Network-layer addresses are used to uniquely identify the sources and destinations of messages, and devices known as "routers" use these addresses to forward messages toward respective destination nodes.

Network layer addresses typically reflect network topology to at least some degree. For example, it is common to assign a block of network-layer addresses having a single "prefix" for exclusive use by nodes connected to a given single link, such as an Ethernet local-area network (LAN). Such a prefix may consist, for example, of some number of most significant bits of a 32-bit IP address. For example, the prefix for a given link may be a 3-byte value represented as 10.4.4. The full address of each node on the link is formed by concatenating the prefix with a node-specific least-significant part, such as a one-byte node number. Thus, the address for node number 122, for example, on the above link would be 10.4.4.122. Network routers utilize the prefix portion of network addresses to forward messages within the network according to the routing protocol. The last router in a path requires the full address in order to identify a specific destination node on the destination link.

Because they reflect network topology, network layer addresses must be configured dynamically, in the context of a specific operational network. In this regard, network-layer addresses differ from layer-2 addresses, or link-layer addresses, which can be device-specific. An example of such layer-2 addresses are Ethernet media access control (MAC) addresses, which are also known as Equipment Unique Identifier 48 (EUI-48) addresses. These addresses are 48 bits in length, and they are generally assigned to devices at the time of their manufacture. An administrative address-assigning authority is responsible for assigning these addresses in a coherent fashion, specifically to ensure global uniqueness of assigned addresses.

Network-layer addresses must be unique within a given network region in which a particular routing protocol is used, in order to unambiguously identify the sources and destinations of messages. To satisfy this uniqueness requirement as well as the above-described topology requirements, the address configuration process has generally been carried out by a human network operator using network management tools. However, the manual configuring of network addresses can have undesirable drawbacks. The configuration process can be time consuming and error prone. For this reason, it is desirable to automate the configuring of network addresses as much as possible.

In U.S. Pat. No. 5,398,242 of Perlman, issued Mar. 14, 1995 and entitled "Automatically Configuring LAN Numbers", a technique is described for automatically assigning numbers to local area networks (LANs) in an extended network having several LANs connected together by bridges. The LAN numbers are used by the bridges to identify LANs in a source routing protocol. One bridge on each LAN becomes a "designated bridge" for the LAN. A central database is used to maintain associations between designated bridges and assigned LAN numbers. The designated bridge for a LAN obtains a LAN number by transmitting a request identifying the bridge and a bridge port to which the LAN is connected. In response, a "root" bridge selects an unused LAN number and includes it in a response message sent back to the requesting bridge. The requesting bridge in turn transmits LAN number identification messages incorporating the LAN number to the other bridges on the LAN, which then use the LAN numbers in executing the source routing protocol.

A network configuration issue that is related to the problem of address configuration is the issue of the best deployment of routers and bridges. There are tradeoffs to be made when considering either device for a given network location. Bridges generally have the advantages of simplicity and low cost. Additionally, there is a large installed base of Ethernet LANs which employ bridges. As traffic increases on a group of bridged links, however, performance can degrade significantly. When a router is used, the various attached links are treated as separate entities from the perspective of the routing protocol. The links are de-coupled from each other at the data link layer, thus operating more independently. However, the use of a router generally results in higher costs and increases the demand for network-layer addresses. Once a router or bridge has been chosen for a given location, traffic conditions may change such that better performance or cost effectiveness could be achieved by replacing a router with a bridge or vice-versa. However, it may be difficult and costly to make such a replacement. A network operator may be forced to choose between undesirable expenditures and sub-optimal network performance.

BRIEF SUMMARY OF THE INVENTION

In accordance with the present invention, a network device is disclosed that can dynamically switch between layer 2 operation and layer 3 operation. This provides desirable flexibility in the deployment of network resources, and promotes efficient use of network layer address space.

The network device includes bridging logic that functions, when enabled, as a data link layer bridge. In particular, the bridging logic receives data link layer messages from two or more communications links coupled to the network device, wherein the communications links form part of a single network-layer segment. The bridging logic forwards the messages received from one communications link to another communications link using the data link layer information in the received messages, such as for example EUI-48 addresses.

The network device also includes routing logic that functions, when enabled, as a network layer router. The routing logic receives network layer messages from the different communications links configured as different network-layer network segments, and selectively forwards the network layer messages received from one communications link to another communications link. The forwarding is based on a network routing algorithm and network layer addresses contained in the received network layer messages. For example, the routing logic may examine Internet Protocol (IP) addresses in the received messages, and process the messages in accordance with a link-state routing algorithm such as the Intermediate System to Intermediate System (IS—IS) or Open Shortest Path First (OSPF) algorithms.

Selection logic in the network device is dynamically operative to enable the bridging logic and disable the routing logic under a first set of operating conditions, and enable the routing logic and disable the bridging logic under a second set of operating conditions. When the transition from router to bridge is made, multiple distinct network-layer segments are merged into a single bridged network-layer segment. When the transition from bridge to router is made, a single bridged network-layer segment is divided into multiple segments, each with a distinct identity from the perspective of the routing algorithm.

Among other potential benefits, the merging of segments results in releasing one or more link numbers for use by other network-layer segments in the network, such as a new segment which might otherwise be denied a link number in the address configuration process. Dividing segments can be useful when the traffic on the network-layer segment becomes very heavy, for example. Segments can be divided in this way if there are unused link numbers available for the new segments being created. The merging and dividing functionality can be used in a complementary fashion by multiple devices in a network region in the dynamic re-configuring of local area network (LAN) boundaries.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
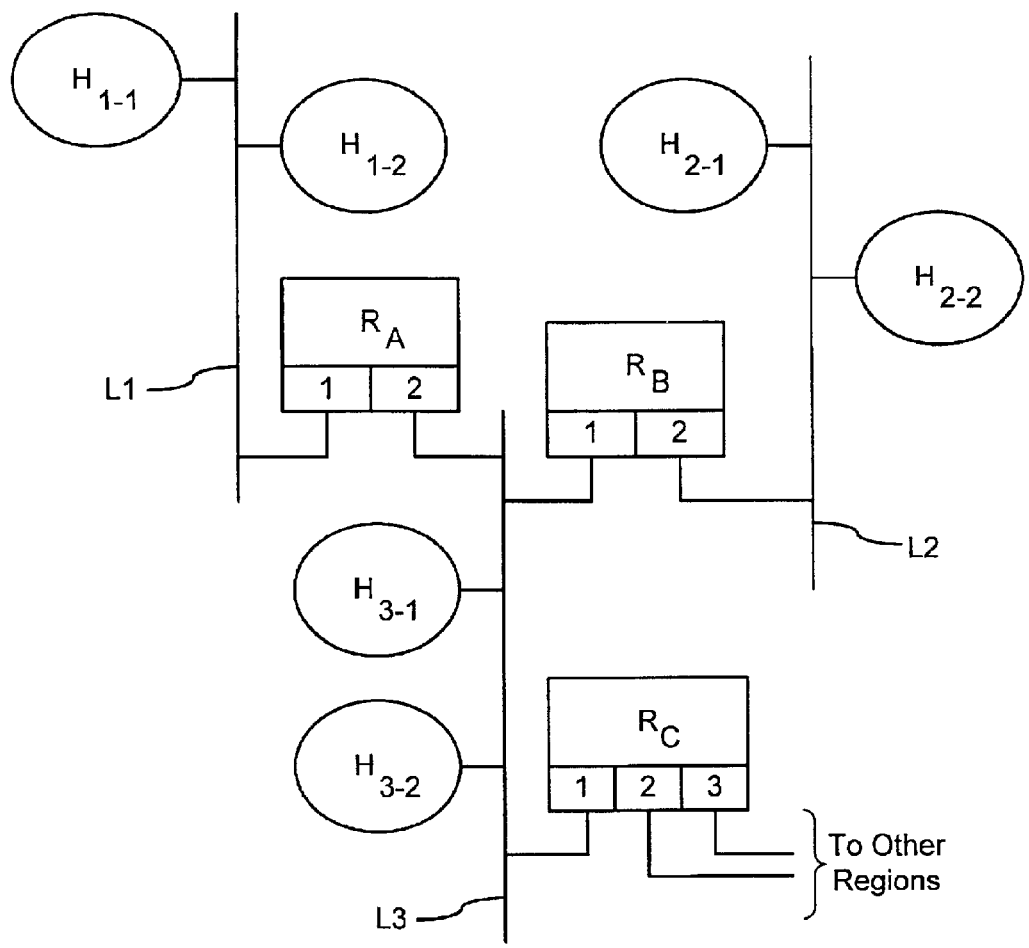
FIG. 1 is a block diagram of a network region consistent with the present invention.

An Internet Protocol (IP) network is partitioned into regions, each of which includes host computers or end nodes, routers, bridges and links. Each link interconnects a subset of the nodes of the region, and the links are interconnected by the routers and/or bridges. A simplified example of such an IP network region is shown in FIG. 1, and is described below. The following description refers to "routers", which may be devices that can function only as routers or may be the router functionality in a device that can also perform bridging. These latter devices are also referred to as "router/bridges" below.

For ease of description, in the illustrated case it is assumed that each link in the region is an Ethernet Local Area Network (LAN), and that each node has a unique 48-bit "media access control" (MAC) address. Uniqueness of Ethernet MAC addresses is guaranteed by a known administrative address-assigning process, which employs a single address-assigning authority. As described below, it is important that routers be uniquely identifiable in a network region. This criterion can be met conveniently by using the MAC addresses in an Ethernet-only environment. In other environments, other methods may be used to uniquely identify the routers in a network region. For example, each router may be allowed to simply choose an identifier at random from a very large identifier space. If the space is sufficiently large, the probability of duplicates is correspondingly low.

The IP protocol is a network-layer or layer-3 communications protocol. Each network node has a layer-3 address, referred to as an IP address, which is used to identify the node as the source or destination of IP messages or "packets". IP routers execute a distributed routing program that is responsible for routing packets along paths from source nodes to one or more destination nodes, based on the IP addresses appearing in the packets and network topology information known to the routers. There are several types of routing programs. These include programs using a "distance vector" algorithm, such as the Routing Information Protocol or RIP, and programs using a "link state protocol", examples of which include the Intermediate System to Intermediate System (IS—IS) and Open Shortest Path First (OSPF) routing protocols. In the present description it is assumed that a link state routing protocol is operating. However, techniques described herein may be practiced in other routing environments, such as a RIP environment, as well.

Figure 2:
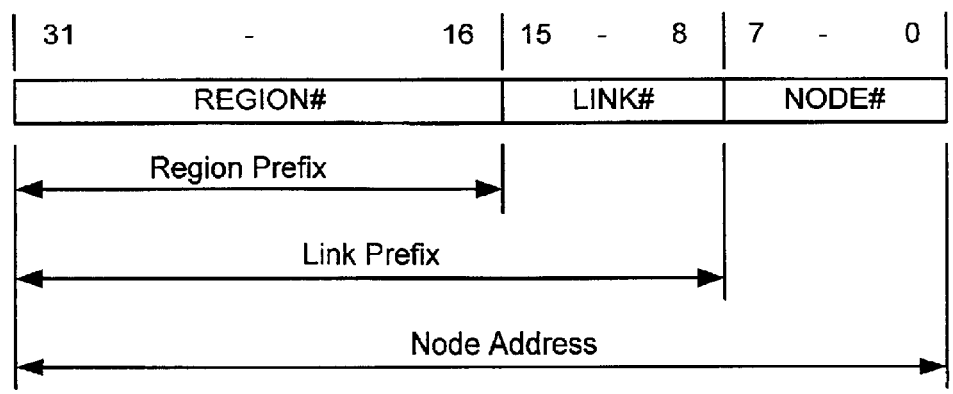
FIG. 2 is a diagram of the structure of a network-layer address in the network region of FIG. 1.

The process by which IP addresses are assigned to the various nodes of a region of an IP network is generally referred to as "address configuration". As described above, it is desirable that address configuration be as automatic as possible, to avoid the problems associated with manual configuration. To this end, the 32-bit IP addresses of the nodes of FIG. 1 are divided into three separate fields as shown in FIG. 2. A first field occupies the most significant 16 bits, labeled bits 31–16. This field is referred to as a "region number", and defines an IP "region prefix" which uniquely identifies a region within a greater IP network. A second field occupies bits 15–8 and is referred to as a "link number". This field is concatenated with the region prefix to form a 3-byte IP "link prefix". The third field, occupying bits 7–0 and referred to as a "node number", is concatenated with the link prefix to form the complete node IP address.

Dividing the IP address into separate fields enables the address configuration task to be broken into three generally independent tasks, namely: (1) configuring a region prefix for each region in a network; (2) configuring a link number for each link in each region; and (3) configuring a node number for each node on each link. There are known algorithms by which a collection of nodes on a link auto-configure themselves with unique node numbers. Additionally, it is assumed for present purposes that a network operator or some other means is relied upon to configure region prefixes and ensure that they are propagated to all the nodes of the region. Accordingly, only the auto-configuring of the link number portion of the IP addresses by the routers in a region is described below.

One router on each link is identified as a "specified router" or SR for purposes of the presently-disclosed auto-configuration protocol. The responsibilities of the SR on each link are to obtain a link number for the link and to inform the other nodes on the link of the obtained link number. The role of SR may be assigned in a variety of ways. For example, network regions using the OSPF or IS—IS routing protocols employ a special agent on each link called a "designated router" or DR, which is automatically selected according to a defined election process. It may be convenient to assign the SR role to the DR for the links in such a network region. However, the SR role may be assigned in different ways, as would be necessary for example in regions using routing protocols that do not employ a DR. The SR may be automatically selected in a manner similar to the election process used in OSPF, or may simply be designated by a network operator or other means.

Once an SR has been established for each link, there are two different techniques that can be used to auto-configure the link number of each link in the region. In one technique referred to as the "centralized" technique, a single router in the region assigns the link numbers and informs the SRs of the link number assignments. For purposes of this description, this single router is referred to as the "address assignment router" or AAR. In another technique, referred to below as the "distributed" technique, the routers communicate among themselves in a fashion that enables the SRs to self-assign link numbers while guaranteeing their uniqueness within the region.

In the centralized technique, the AAR is first selected in some fashion. This can be done, for example, by causing each router to execute the well-known spanning tree algorithm to identify a "root node", to which the role of AAR is then assigned. Alternatively, in a link-state routing environment in which each router knows of identifier (ID) values for all of the other routers, the router whose ID meets a certain criterion (such as the highest ID value) can be declared the AAR. It is possible for the role of AAR to be transferred dynamically from one router to another. This operation is described below.

Each router acting as an SR for a link creates a "link name" that is used to uniquely identify the link for purposes of the auto-configuration protocol. In the assumed Ethernet-only region, a 7-byte link name is conveniently formed by concatenating a 6-byte MAC address associated with the SR and a one-byte value that uniquely identifies the link to the SR. This one-byte value may be, for example, a "port number" used within the SR to identify the port of the SR to which the link is connected Note that an SR may have multiple MAC addresses, one for each link to which it is attached. In such a case, the SR may generally choose any of its MAC addresses to form the link name. In alternative embodiments, the local link identifier may be chosen in other ways, and may contain more or fewer bits as may be necessary and convenient.

The SR for each link then generates an address request message containing the link name, and sends this message to the AAR. For reasons discussed below, this message may also have a field for holding a "previous link name" value and a "present link number" value. In general, the message may be sent in either a unicast or a multicast manner. In a link-state routing environment, the message preferably takes the form of a link-state packet that is flooded to all routers.

The AAR receives the address request messages from all the SRs, assigns region-wise unique one-byte link numbers to the various links, and sends address assignment messages to the SRs to inform them of the link number assignments. The AAR maintains a table that associates each received 7-byte link name with a corresponding link number as assigned by the AAR. As described below, this list is updated dynamically in order to accommodate changes in the network, such as the initialization of new links, router outages, etc.

If the network region has an excessively high number of links (in the illustrated embodiment more than 256), the AAR can become unable to fulfill address requests once all possible link numbers have been assigned. The nodes attached to a link for which a link number request has been denied are not able to communicate with nodes on other links, although they are still able to communicate among themselves. As a general matter, it is desirable that the number of links in a region be fewer than the maximum number of link numbers that can be assigned. This goal can be realized to some extent using manual configuration processes. Additionally, a technique described below can be used to dynamically merge links under certain conditions to assist in reaching this goal.

Preferably, the address assignment messages generated by the AAR are multicast messages that are flooded throughout the region, although they can also be individually addressed unicast messages. If the messages are sent reliably (for example, as part of a link-state protocol), then it is necessary to send messages only when there is a change in the address assignment information. Otherwise, the messages can be sent at regular time intervals, for example.

Each address assignment message includes the contents of the above-described table, i.e., the set of pairings (link name, link number) created by the AAR. Each SR receives the address-assignment messages and extracts the link number paired with the 7-byte link name of each link for which the SR is responsible. The SR concatenates the one-byte link number with the 2-byte IP region prefix (FIG. 2) to create the 3-byte IP link prefix for the link. The SR maintains the link prefix in a routing database for use in the execution of the routing protocol. The SR also forwards the link prefix to all the other nodes on the link by periodic announcements or responses to queries, as is known in the art. Each node forms its complete IP address by concatenating its node number (configured by other means as discussed above) with the link prefix, and uses this address in carrying out the IP communications protocol.

An example is presented to illustrate the operation of the centralized technique. Referring to FIG. 1, a network region includes three Ethernet links L1, L2 and L3. Attached to link L1 are two host nodes $H_{1-1}$, $H_{1-2}$ and a router node $R_A$. Attached to link L2 are two host nodes $H_{2-1}$, $H_{2-2}$ and a router node $R_B$. Attached to link L3 are two host nodes $H_{3-1}$, $H_{3-2}$, the two router nodes $R_A$ and $R_B$, and another router node $R_C$. As shown, each router node has multiple ports, labeled "1", "2", etc., for connection to different links. Ports 2 and 3 of router $R_C$ are connected to unlabeled links assumed to be outside the region for purposes of auto-configuration.

As mentioned above, each node in the illustrated example has a unique MAC address. For purposes of this description, the values of the MAC addresses for the routers $R_A$, $R_B$, and $R_C$ are referred to symbolically as $MAC_A$, $MAC_B$, and $MAC_C$ respectively. It is further assumed that the roles of SR for the various links and the role of AAR have been established as follows:

| | |
|---|---|
| Link 1 SR | $R_A$ |
| Link 2 SR | $R_B$ |
| Link 3 SR | $R_C$ |
| AAR | $R_A$ |

Each SR first forms a link name, in this example using port numbers as the one-byte local link identifiers. The results of these operations are as follows, where "|" indicates concatenation:

| Link | SR | Link Name |
|------|-----|-----------|
| L1   | $R_A$ | $MAC_A|1$ |
| L2   | $R_B$ | $MAC_B|2$ |
| L3   | $R_C$ | $MAC_C|1$ |

Next, each SR forms an address request message including the respective link name, and sends the message to the AAR. The AAR performs the link number assignment according to an algorithm that guarantees that no link number is assigned to more than one link. For illustration purposes, it is assumed that the AAR creates the following link number assignments:

| Link Name | Link # |
|-----------|--------|
| $MAC_A|1$ | 15 |
| $MAC_B|2$ | 26 |
| $MAC_C|1$ | 105 |

Finally, the AAR generates address assignment messages containing the link number assignments for all link names known to it, and broadcasts these messages throughout the region. When router $R_A$ sees a message containing the entry ($MAC_A|1$, 15), it concatenates the number 15 to the IP region prefix to yield an IP link prefix, and configures link L1 with this link prefix. Router $R_A$ also forwards this link prefix to the hosts $H_{1-1}$ and $H_{1-2}$ for their use in forming an IP address as described above. Similar actions occur at routers $R_B$ and $R_C$, which use the values 26 and 105 respectively to form the link prefixes for links L2 and L3.

In order to promote stability in the link number assignments despite router outages and other events in the network, each address request message for a link preferably contains both the currently assigned link number (if any) and a value called the "previous link name" (if any). The currently assigned link number can be useful, for example, if the address configuration information has become lost at the AAR. In such a case, the AAR re-assigns the current link number (as contained in the request message) to the link name in the request message, and regenerates the pairing for the link in its address configuration database. The link number assigned to the link remains the same.

The previous link name is useful when a router assumes the role of SR from a router originally acting as the SR, which happens for example when the original SR suffers an outage. In this case, a pairing has already been established between a link number and a link name based on the MAC address of the original SR. To the AAR, however, a request from the new SR (containing a link name based on its MAC address) appears to be a request for a new link number. Before assigning a new link number, however, the AAR first determines whether a pairing already exists for the previous link name contained in the request. If such a pairing exists, the AAR changes the link name in the pairing to the new link name contained in the request, and includes this new pairing in its address assignment messages. Once the new SR receives an address assignment message containing the new pairing, it no longer needs to include the previous link name in its address request messages.

While the above-described technique employs the MAC addresses of the SRs to uniquely identify the links to the AAR, in alternative embodiments this unique identification may be achieved in other ways. For purposes of the auto-configuration protocol, the values used for link names need only distinguish among the links in a region. It may be convenient, for example, to employ codes that specify a manufacturer, model and serial number for each router, which combination is guaranteed to be unique for each router in a network.

It is possible for auto-configuration of IP addresses to be performed without the use of a central address-assigning authority such as the AAR. To do so, the SRs select link numbers for themselves and then communicate with each other to detect and resolve any conflicts in the selections. This technique is particularly suited to the link-state routing environment, in which all the routers are continually broadcasting and receiving link-state packets as part of the routing protocol. It is also adaptable to other routing environments as well.

Each SR maintains a database containing (link name, link number) pairings that are known to the SR from information in link-state packets received from other routers. When an SR requires a link number for an attached link, it selects one that is unassigned according to this database, and includes the selected link number in its link-state packets. Each SR continually monitors received link-state packets to determine whether another SR has selected the same link number. If such a condition is detected, then some priority criterion is evaluated to determine whether an alternative link number must be selected. For example, an SR may select another link number if the other SR has a numerically greater link name. Other algorithms for resolving conflicts in the selection of link numbers can also be used.

As previously mentioned, there must be some means by which region prefixes are made known to the nodes in a region. Generally, one or more routers exist at the "edge" of a region, meaning that they have at least one connection to the greater network of which the region is only a part. In the exemplary network region of FIG. 1, for example, router $R_C$ may serve as such an edge router. It may be convenient to provide a region prefix to such an edge router, for example by manual configuration, and enable the edge router to automatically disseminate the region prefix to the other nodes in the region. In a link-state routing environment, this dissemination can be accomplished using special link-state packets containing the assigned region prefix and a flag or other indication. The SR for each link can then inform the nodes on the link using a mechanism like that used to disseminate the link number.

As mentioned above, there may be operating conditions in which all available link numbers for a region have been used when an SR attempts to acquire a link number on behalf of a link. In general, under such circumstances the nodes on the link cannot be configured with network layer addresses, and therefore these nodes are effectively excluded from the region. The likelihood of such circumstances can be reduced by careful network planning and management. Nevertheless, it is desirable that there be a more dynamic way of addressing this problem, in order to provide flexibility in network configuration without the need for the intervention of network management personnel.

To address this issue, certain devices in a region incorporate bridging functionality as well as routing functionality. The routing function operates at layer 3, or the network layer, while the bridging function operates at layer 2, or the data link layer, of the OSI model. For purposes of this description, these devices are referred to as router/bridges.

Each such device incorporates a selection function that causes it to function as a router under one set of operating conditions and to function as a bridge under another set of operating conditions. When a router/bridge is functioning as a router, different attached links are generally treated as separate entities from a routing perspective. In particular, different attached links are configured with different network-layer address prefixes. When a router/bridge is functioning as a bridge, two or more attached links are logically merged into a single network-layer link from a routing perspective, and thus a single network-layer address prefix is shared by all nodes on the merged links.

The router/bridge functionality can be illustrated with a variation of the above example. Let it be assumed that the SR for link L3 is the device $R_B$ (which is a router/bridge) instead of router $R_C$. Let it be further assumed that link number request messages are generated for links L1, L3 and L2 in that order, and the AAR is unable to assign a link number in response to the request on behalf of link L3. Upon discovering that a separate link number for link L3 cannot be obtained, the router/bridge $R_B$ consults an internally-maintained configuration database that includes data regarding the number of nodes on each attached link. The router/bridge $R_B$ determines whether there are more than some desirable maximum number of nodes connected to links L3 and L2 collectively. This maximum number may be 256, for example, which is the maximum number of available 8-bit node numbers. To allow room for growth, it may be desirable that this maximum number be a smaller value, such as 128 or a number between 128 and 256. If the number of nodes attached to links L3 and L2 collectively is not more than this number, the router/bridge $R_B$ assumes the function of a bridge with respect to these two links.

Although in the foregoing example, the router/bridge that assumes the function of a bridge is the device $R_B$ serving as the SR for the link L3, in general any router/bridge can change its function to achieve a desired configuration. In general, an SR maintains the information that is needed to make the decision to change function, whereas this information may not exist at a non-SR device. However, a non-SR device can either be provided with the information to permit it to act autonomously, or it can be directed to change its function by a command message from another router or non-router device in the network.

In the simplified example above, the router/bridge $R_B$ is concerned with only two links, L2 and L3, that can potentially be merged. In general, a router/bridge may have more than two attached links from which to choose candidates for merging. In such a case, some type of selection algorithm must be employed. As a general matter, it is preferable to merge links having relatively fewer attached nodes, so that the merged link does not have an unnecessarily large number of nodes. A router/bridge can make this choice alone if it has sufficient information, specifically information concerning the number of nodes connected to each link attached to the router.

However, it may be that such information is either incomplete or totally lacking at a router/bridge. This would be the case, for example, when a non-SR router/bridge is the best candidate to make the desired functional change. More generally, it may be that there are links attached to another router/bridge in the region that are better candidates for merging than the router/bridge that has detected the need for merging. Therefore, it is generally desirable that the routers, bridges, and router/bridges in a region communicate among themselves in some fashion to enable the proper merging decision to be made. This communication can be accomplished, for example, as an extension to the routing protocol being employed in the region. In the centralized configuration method described above, for example, it may be desirable for the AAR to make merging decisions and to instruct router/bridges to change functionality as necessary. If a decision is made at a given router/bridge and involves only locally attached links, the router/bridge can switch its functionality autonomously. However, any distributed algorithm should ensure that different router/bridges make compatible decisions. Inter-device communications can be advantageously employed toward this end.

There are various methods by which router/bridges can determine the population of attached links. A given router/bridge may be responsible for assigning node numbers on the link, and therefore is aware of the link population as a result of tracking the assigned node numbers. It may be convenient for the AAR to maintain this information when the centralized link number assignment technique described above is employed. In such a case, each router forwards link population information to the AAR as part of a request message or other protocol message. When the distributed link-number assignment technique is used, the link population information can be included in the link-state packets flooded to all routers, and each router/bridge is responsible for maintaining the relevant information.

It may be useful for additional information to be maintained and used in making decisions regarding link merging. This information can include, for example, the amount of traffic appearing on a link over a recent interval, or other information concerning the activity of nodes on the link. In general, any potentially relevant information can be useful.

It may also may be desirable that network-layer links be dynamically dividable, especially in network regions employing dynamic merging. It may be desirable to divide a link, for example, if it becomes very large or its traffic approaches the traffic-bearing capacity of the link. In this case, a router/bridge switches from functioning as a bridge with respect to two or more attached links to functioning as a router with respect to at least some of those links. That is, one or more of the attached links is assigned a new network-layer prefix, using for example one of the above-described techniques, and the previously bridged links become separate entities in the routing database. This type of change requires that a link prefix be obtainable for each new link to be created. There are also considerations similar to those for the merging decision, such as the general desirability of dividing larger or more active network-layer links before dividing smaller or quieter links. As in the case of link merging, the decision to divide a network layer link may be made locally or in concert with one or more other router/bridges.

Methods and apparatus for dynamically changing the boundaries of local area networks have been shown. It will be apparent to those skilled in the art that modifications to and variations of the disclosed techniques are possible without departing from the inventive concepts disclosed herein, and therefore the invention should not be viewed as limited except to the full scope and spirit of the appended claims.

What is claimed is:

1. A network device, comprising:
bridging logic operative, when enabled, to function as a data link layer bridge by (i) receiving data link layer messages from first and second communications links coupled to the network device, the first and second communications links forming part of a single network-layer network segment, and (ii) forwarding the messages received from either one of the communications links to the other communications link;

routing logic operative, when enabled, to function as a network layer router by (i) receiving network layer messages from the first and second communications links, the first and second network links forming respective different network-layer network segments, and (ii) selectively forwarding the network layer messages received from either one of the communications links to the other communications link based on a routing algorithm and respective network layer network addresses in the received network layer messages; and selection logic operative during operation of the network device to (i) enable the bridging logic and disable the routing logic under a first set of operating conditions, wherein a transition from router operation to bridge operation includes merging multiple network-layer segments into a bridged network-layer segment and (ii) enable the routing logic and disable the bridging logic under a second set of operating conditions, wherein a transition from bridge operation to router operation includes dividing a bridged network-layer segment into multiple segments having distinct routing identities.

2. A network device comprising:

bridging logic operative, when enabled, to function as a data link layer bridge by (i) receiving data link layer messages from first and second communications links coupled to the network device, the first and second communications links forming part of a single network-layer network segment, and (ii) forwarding the messages received from either one of the communications links to the other communications link;

routing logic operative, when enabled, to function as a network layer router by (i) receiving network layer messages from the first and second communications links, the first and second network links forming respective different network-layer network segments, and (ii) selectively forwarding the network layer messages received from either one of the communications links to the other communications link based on a routing algorithm and respective network layer network addresses in the received network layer messages; and selection logic operative during operation of the network device to (i) enable the bridging logic and disable the routing logic under a first set of operating conditions, and (ii) enable the routing logic and disable the bridging logic under a second set of operating conditions, wherein the first set of operating conditions includes the condition that less than a predetermined number of link numbers are available for use as part of a network-layer address prefix for one of the communications links.

3. A network device according to claim 1, wherein the second set of operating conditions includes the condition that the number of nodes residing on the first and second communications links collectively exceeds a predetermined threshold number.

4. A network device according to claim 3, wherein the selection logic is operative to track the number of nodes on the first and second communications links, and to autonomously decide to enable the routing logic and disable the bridging logic.

5. A network device according to claim 2, wherein the selection logic is operative to autonomously determine whether the first set of operating conditions are met.

6. A network device according to claim 2, wherein the selection logic is operative to cooperate with another network device in a common network region in determining whether the first set of operating conditions are met.

7. A network device according to claim 2, wherein the determination of whether the first set of operating conditions are met is made by a separate network device in a common network region, and wherein the selection logic is operative to enable the bridging logic and disable the routing logic in response to a control message received from the separate network device.

8. A network device according to claim 2, wherein (i) the first and second communications links are part of a group of three or more communications links coupled to the network device with respect to which bridging and routing functionality can be selected, (ii) the selection logic is further operative in accordance with a predetermined selection algorithm to select the communications links in the group that are to have their respective routing and bridging functions enabled and disabled.

9. A network device according to claim 8, wherein the predetermined algorithm for selecting communications links under the first set of operating conditions includes selecting a pair of communications links collectively having fewer attached nodes than any other pair of communications links in the group.

10. A network device according to claim 8, wherein the predetermined algorithm for selecting communications links under the second set of operating conditions includes selecting the communications links included in the network segment having more attached nodes than any other network segment defined by communications links in the group.

11. A method of operating a network device, comprising:

performing the function, when enabled, of a data link layer bridge by (i) receiving data link layer messages from first and second communications links coupled to the network device, the first and second communications links forming part of a single network-layer network segment, and (ii) forwarding the messages received from either one of the communications links to the other communications link;

performing the function, when enabled, of a network layer router by (i) receiving network layer messages from the first and second communications links, the first and second network links forming respective different network-layer network segments, and (ii) selectively forwarding the network layer messages received from either one of the communications links to the other communications link based on a routing algorithm and respective network layer network addresses in the received network layer messages; and operation of the network device, (i) enabling the bridge function and disabling the router function under a first set of operating conditions, and (ii) enabling the router function and disabling the bridge function under a second set of operating conditions, wherein the first set of operating conditions includes the condition that less than a predetermined number of link numbers are available for use as part of a network-layer address prefix for one of the communications links.

12. A computer program product including a computer readable medium, the computer readable medium having a network router/bridge program stored thereon for execution in a computer functioning as a network node, the network router/bridge program comprising:

program code operative, when enabled, to function as a data link layer bridge by (i) receiving data link layer messages from first and second communications links coupled to the network node, the first and second communications links forming part of a single network-layer network segment, and (ii) forwarding the messages received from either one of the communications links to the other communications link;

program code operative, when enabled, to function as a network layer router by (i) receiving network layer messages from the first and second communications links, the first and second network links forming respective different network-layer network segments, and (ii) selectively forwarding the network layer messages received from either one of the communications links to the other communications link based on a routing algorithm and respective network layer network addresses in the received network layer messages; and program code operative during operation of the network node to (i) enable the bridge program code and disable the router program code under a first set of operating conditions, and (ii) enable the router program code and disable the bridge program code under a second set of operating conditions, wherein the first set of operating conditions includes the condition that less than a predetermined number of link numbers are available for use as part of a network-layer address prefix for one of the communications links.

13. A computer data signal including a network router/bridge program for execution in a computer functioning as a network node, the network router/bridge program comprising:

program code operative, when enabled, to function as a data link layer bridge by (i) receiving data link layer messages from first and second communications links coupled to the network node, the first and second communications links forming part of a single network-layer network segment, and (ii) forwarding the messages received from either one of the communications links to the other communications link;

program code operative, when enabled, to function as a network layer router by (i) receiving network layer messages from the first and second communications links, the first and second network links forming respective different network-layer network segments, and (ii) selectively forwarding the network layer messages received from either one of the communications links to the other communications link based on a routing algorithm and respective network layer network addresses in the received network layer messages; and program code operative during operation of the network node to (i) enable the bridge program code and disable the router program code under a first set of operating conditions, and (ii) enable the router program code and disable the bridge program code under a second is set of operating conditions, wherein the first set of operating conditions includes the condition that less than a predetermined number of link numbers are available for use as part of a network-layer address prefix for one of the communications links.

14. A network device, comprising:

means for functioning, when enabled, as a data link layer bridge by (i) receiving data link layer messages from first and second communications links coupled to the network device, the first and second communications links forming part of a single network-layer network segment, and (ii) forwarding the messages received from either one of the communications links to the other communications link;

means for functioning, when enabled, as a network layer router by (i) receiving network layer messages from the first and second communications links, the first and second network links forming respective different network-layer network segments, and (ii) selectively forwarding the network layer messages received from either one of the communications links to the other communications link based on a routing algorithm and respective network layer network addresses in the received network layer messages; and means operative during operation of the network device for (i) enabling the bridge function and disabling the router function under a first set of operating conditions, and (ii) enabling the router function and disabling the bridge function under a second set of operating conditions, wherein the first set of operating conditions includes the condition that less than a predetermined number of link numbers are available for use as part of a network-layer address prefix for one of the communications links.

* * * * *